United States Patent
Chen

(10) Patent No.: US 6,814,415 B2
(45) Date of Patent: *Nov. 9, 2004

(54) COMPUTER ENCLOSURE

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 116 days.

This patent is subject to a terminal disclaimer.

(21) Appl. No.: 10/082,993

(22) Filed: Feb. 25, 2002

(65) Prior Publication Data

US 2003/0160548 A1 Aug. 28, 2003

(51) Int. Cl.[7] .............................................. A47B 97/00
(52) U.S. Cl. .................................................. 312/223.2
(58) Field of Search .......................... 312/223.1, 223.2, 312/265.1, 265.5, 265.6, 257.1, 263; 361/724, 725, 726, 683; 220/4.02, 4.28

(56) References Cited

U.S. PATENT DOCUMENTS 5,527,104 A * 6/1996 Moss .......................... 312/264
5,971,506 A * 10/1999 Dubin ....................... 312/223.2
6,052,277 A * 4/2000 Liu et al. ..................... 361/685
6,082,842 A * 7/2000 Ho ........................... 312/257.1
6,157,532 A * 12/2000 Cook et al. .................. 361/681
6,652,048 B2 * 11/2003 Chen ........................ 312/223.2

FOREIGN PATENT DOCUMENTS

GB          2255674        * 11/1992

* cited by examiner

Primary Examiner—James O. Hansen
(74) Attorney, Agent, or Firm—Wei Te Chung

(57) ABSTRACT

A computer enclosure includes a cage (1) and a cover (5) attached on the cage. The cage is integrally formed from a single sheet of metallic material, and includes a side panel (10), a front panel (20) and a rear panel (30). The side panel has a projecting portion (12) extending outwardly from a front portion thereof. The projecting portion defines locking openings (14). The front panel includes a top flange (21), a bottom flange (22), and a side flange (23). The rear panel defines locking slots (32). The cover includes a side board (50), a top board (60), and a bottom board (70). The side board forms side hooks (52a) engaging in the locking openings, and tabs (54) engaging in the locking slots. The top board forms top hooks (52b) engaging with the top flange, and the bottom board forms bottom hooks (52c) engaging with the bottom flange.

10 Claims, 3 Drawing Sheets

COMPUTER ENCLOSURE

BACKGROUND OF THE INVENTION

1. Field of the Invention

The present invention relates to computer enclosures, and particularly to computer enclosures which are readily assembled and can prevent electromagnetic interference (EMI).

2. Related Art

With current widespread use of personal computers, the demand for more and varied functions is unrelentingly high. It is thus frequently necessary to upgrade a mainframe of a computer, such as by way of expanding memory of the mainframe or adding electrical components to the mainframe. For conveniently adding or replacing electrical components, a computer enclosure needs to be able to be opened, closed, assembled or disassembled as quickly and conveniently as possible.

A conventional computer enclosure comprises a cage and a cover. The cage comprises a front panel, a rear panel, a side panel and a bottom panel. The front panel, the rear panel, the side panel and the bottom panel are separately manufactured and attached together with rivets. The cover is attached to the cage. The cover comprises a top plate opposite from the bottom panel of the cage, and a side plate opposite from the side panel of the cage.

Using rivets to assemble the cage is unduly laborious and time-consuming. Furthermore, the front panel, the rear panel, the side panel and the bottom panel are separately manufactured. Gaps invariably exist between the respective adjoining panels. Therefore, the computer enclosure does not prevent

SUMMARY OF THE INVENTION

Accordingly, an object of the present invention is to provide a computer enclosure which has a cage integrally formed from a single sheet of metallic material.

Another object of the present invention is to provide a computer enclosure which minimizes EMI.

To achieve the above-mentioned objects, a computer enclosure in accordance with the present invention comprises a cage and a cover. The cage is integrally formed from a single sheet of metallic material. The cage comprises a side panel, a front panel, and a rear panel. The side panel has a projecting portion extending outwardly from a front portion thereof. The projecting portion defines a plurality of locking openings. The front panel comprises a top flange, a bottom flange, and a side flange. The rear panel defines a plurality of locking slots. The cover comprises a side board, a top board, and a bottom board. The side board forms a plurality of side hooks in a front portion thereof, and a pair of tabs in a rear portion thereof. The top board forms a pair of top hooks, and the bottom board forms a pair of bottom hooks. A top bent plate depends from the top board, and a bottom bent plate extends upwardly from the bottom board.

In assembly, the cage is placed in front of the cover and then pushed rearwardly to cause the side hooks to engage in the corresponding locking openings and the tabs to engage in the locking slots. The top hooks of the cover sandwich the top flange with the top board. The bottom hooks sandwich the bottom flange with the bottom board. A rivet is extended through the top bent plate and a top portion of the side flange. Another rivet is extended through the bottom bent plate and a bottom portion of the side flange. Rivet joints are thus formed between the cover and the cage.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
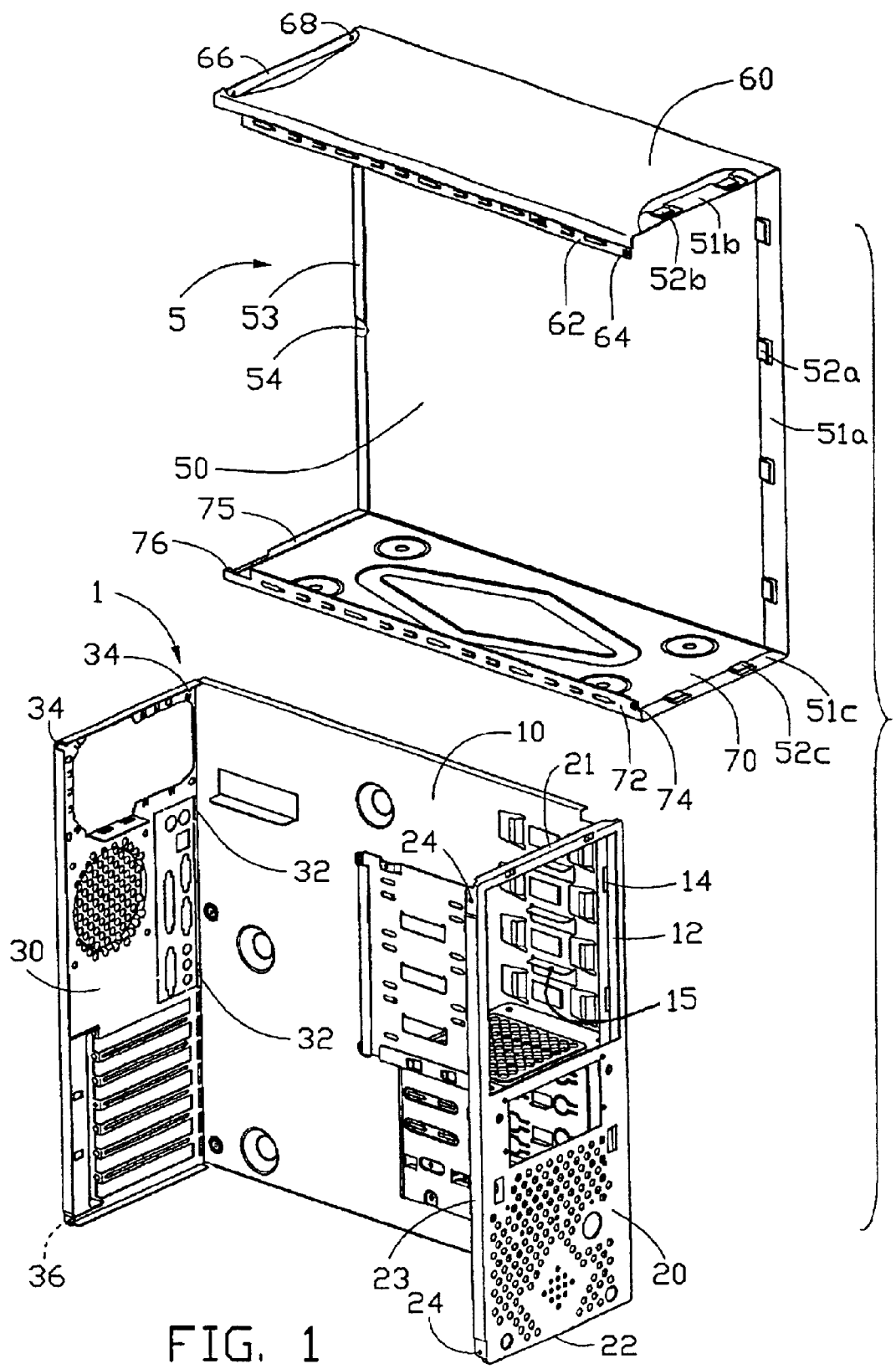
FIG. 1 is an exploded perspective view of a computer enclosure in accordance with the present invention, with parts of a cover thereof cut away for clearer illustration.
Figure 2:
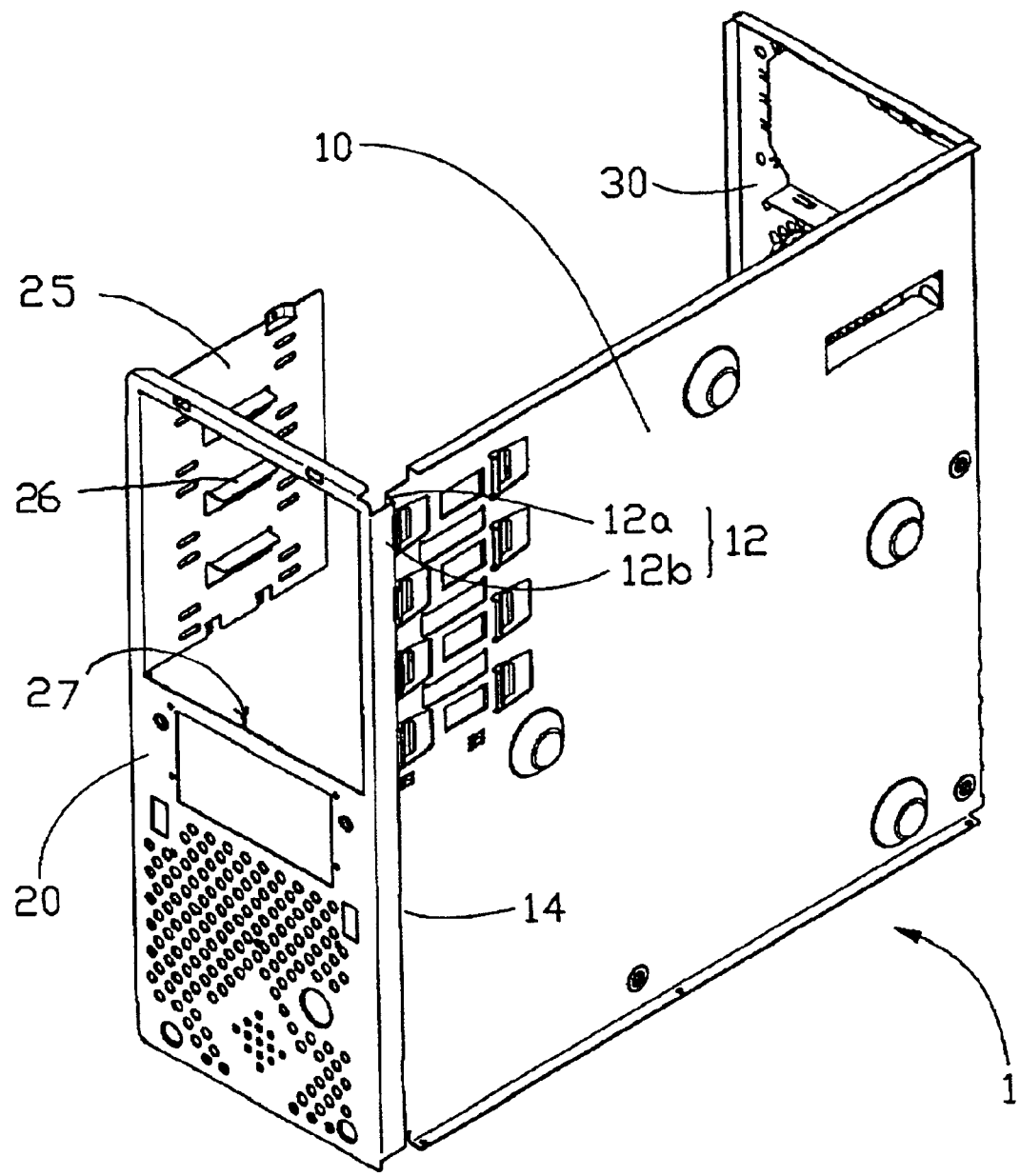
FIG. 2 is a perspective view of a cage of the computer enclosure of FIG. 1, but viewed from another aspect.

Referring to FIGS. 1 and 2, a computer enclosure in accordance with the present invention comprises a cage 1 and a cover 5.

The cage 1 is integrally stamped from a single sheet of metallic material. The cage 1 comprises a side panel 10 for supporting a motherboard (not shown) thereon, a front panel 20, and a rear panel 30. The side panel 10 has a projecting portion 12 stamped outwardly from a front portion thereof. The projecting portion 12 comprises an extending plate 12a extending perpendicularly outwardly from a front edge of the side panel 10, and a connect plate 12b extending perpendicularly forwardly from an outmost edge of the extending plate 12a. A plurality of vertically spaced locking openings 14 is defined in the extending plate 12a adjacent the connect plate 12b.

The front panel 20 extends perpendicularly from a front edge of the connect plate 12b of the projecting portion 12. Free edges of the front panel 20 are bent perpendicularly rearwardly to form a top flange 21, a bottom flange 22, and a side flange 23. A pair of first through holes 24 is defined near top and bottom extremities of the side flange 23 respectively.

The rear panel 30 extends perpendicularly from a rear edge of the side panel 10. A pair of spaced locking slots 32 is defined near a side edge of the rear panel 30 adjacent the side panel 10. A pair of first through apertures 34 is defined in opposite sides of a top portion of the rear panel 30. A first through bore 36 is defined in a bottom portion of the rear panel 30, near a side edge of the rear panel 30 that is distal from the side panel 10.

The cover 5 is integrally stamped from a single sheet of metallic material. The cover 5 comprises a side board 50, a top board 60 extending from a top edge of the side board 50, and a bottom board 70 extending from a bottom edge of the side board 50. Front edges of the side board 50, the top board 60 and the bottom board 70 are respectively bent inwardly to double over and form a side hem 51a, a top hem 51b and a bottom hem 51c. The side hem 51a forms a plurality of L-shaped side hooks 52a, corresponding to the locking openings 14 of the cage 1. The top hem 51b forms a pair of L-shaped top hooks 52b, corresponding to the top flange 21 of the cage 1. The bottom hem 51c forms a plurality of L-shaped bottom hooks 52c, corresponding to the bottom flange 22 of the cage 1. A top fringe 66 depends from a rear edge of the top board 60. A pair of second through apertures 68 is defined in opposite sides of the top fringe 66, corresponding to the first through apertures 34 of the cage 1. A side fringe 53 extends perpendicularly inwardly from a rear edge of the side board 50. A pair of locking tabs 54 (only one visible) extends perpendicularly inwardly from the side fringe 53, corresponding to the locking slots 32 of the cage 1. A bottom fringe 75 extends perpendicularly upwardly from a rear edge of the bottom board 70. A second through bore 76 is defined near one side of the bottom fringe 75, corresponding to the first through bore 36 of the cage 1. A top bent plate 62 depends from the top board 60, adjacent a longitudinal free edge of the top board 60. A bottom bent plate 72 extends upwardly from a longitudinal free edge of the bottom board 70. A pair of second through holes 64, 74 is respectively defined near front edges of the top and bottom bent plates 62, 72, corresponding to the first through holes 24 of the cage 1.

Figure 3:
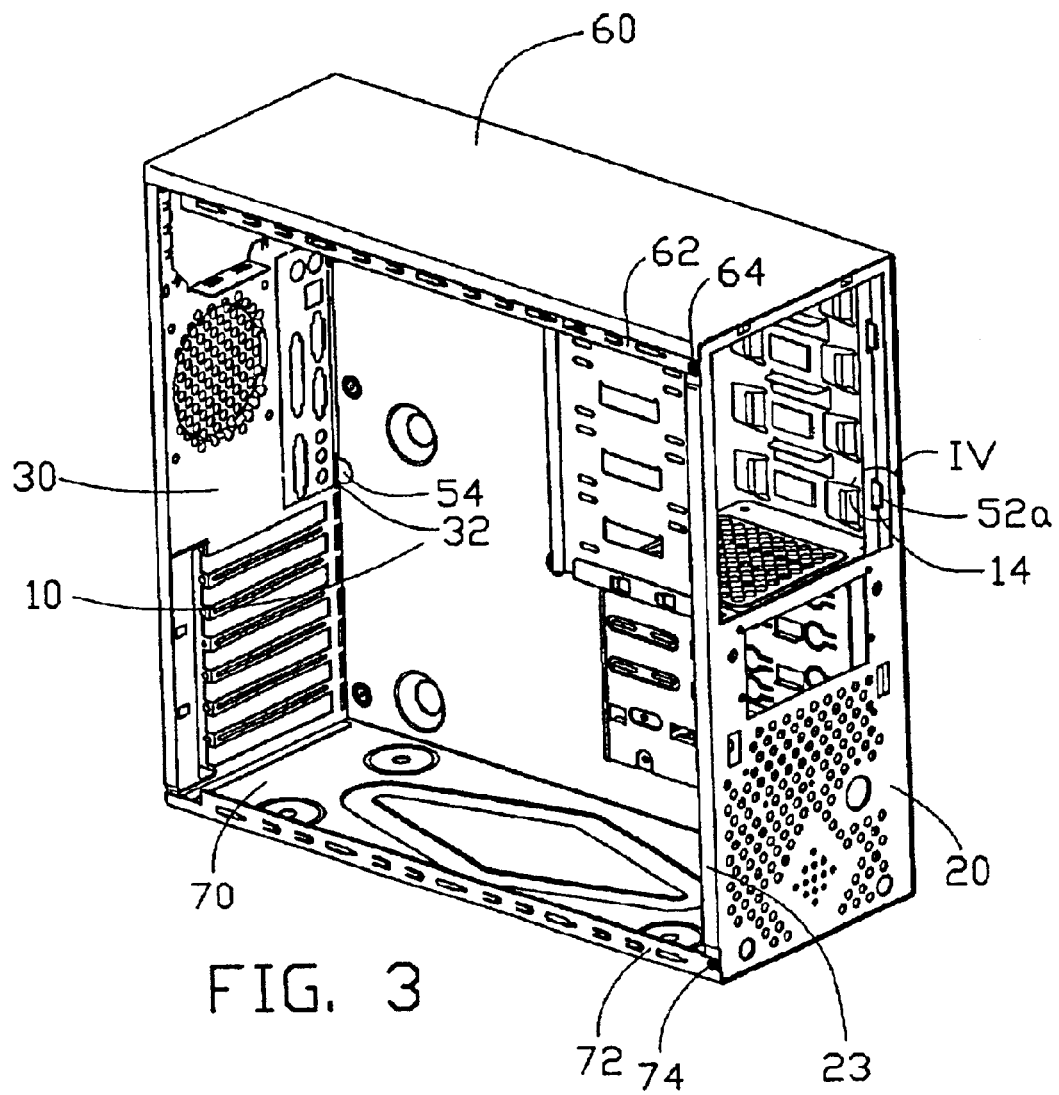
FIG. 3 is an assembled view of FIG. 1.
Figure 4:
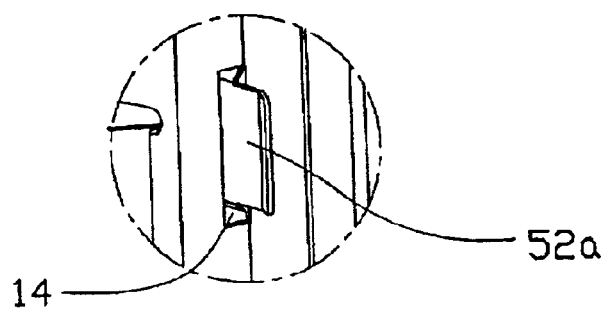
FIG. 4 is an enlarged view of a circled portion IV of FIG. 3.

Referring also to FIGS. 3 and 4, in assembly, the cage 1 is placed in front of the cover 5. The cage 1 is rearwardly pushed into the cover 5 until the rear panel 30 of the cage 1 abuts the side, top and bottom fringes 53, 66, 75 of the cover 5. The side hooks 52a of the cover 5 are engaged in the locking openings 14 of the cage 1. The top hooks 52b of the cover 5 sandwich the top flange 21 of the cage 1 with the top hem 51b of the top board 60. The bottom hooks 52c of the cover 5 sandwich the bottom flange 22 of the cage 1 with the bottom hem 51c of the bottom board 70. The locking tabs 54 of the cover 5 are engaged in the locking slots 32 of the cage 1. The side board 50 of the cover 5 abuts the side panel 10 of the cage 1. The top and bottom boards 60, 70 of the cover 5 are connected between the front and rear panels 20, 30 of the cage 1. Rivets (not shown) are respectively extended through the second through holes 64, 74 of the cover 5 and the first through holes 24 of the front panel 20, the second through bore 76 of the cover 5 and the first through bore 36 of the rear panel 30, and the second through apertures 68 of the cover 5 and the first through apertures 34 of the rear panel 30. The rivets form rivet joints between the cage 1 and the cover 5. The computer enclosure is thus completely assembled.

In the present invention, the cage 1 and the cover 5 are each integrally formed from a single sheet of metallic material. Gaps in the computer enclosure are therefore minimized, and EMI is accordingly minimized. Optionally, in the present invention, the drive opening 27 is formed in the front panel 20 for receipt of the disk drive wherein the side panel 10 forms the protrusion 15 for engagement with one side of the inserted drive (not shown) and a stamped portion 25 of the front panel 20 from the opening 27 is parallel to the side panel 10 and forms the protrusion 26 for engagement with the other side of the inserted drive (not shown).

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a cage integrally formed from a single sheet of metallic material, the cage comprising a side panel and a rear panel perpendicular to the side panel, the side panel having a projecting portion extending outwardly from a front portion thereof, the projecting portion defining a plurality of locking openings, the rear panel defining a locking slot; and
   a cover attached on the cage and comprising a side board forming a plurality of side hooks engaging in the locking openings respectively, and a tab engaging in the locking slot; wherein
   the cage further comprises a front panel having a top flange extending inwardly from a top edge thereof, and a bottom flange extending inwardly from a bottom edge thereof, and the cover further comprises a top board forming a top hook sandwiching the top flange with the top board, and a bottom board forming a bottom hook sandwiching the bottom flange with the bottom board.

2. The computer enclosure as claimed in claim 1, wherein front edges of the side board, the top board and the bottom board are respectively bent inwardly to double over and form a side hem, a top hem and a bottom hem, and the side hooks, the top hook, and the bottom hook are respectively formed on the side hem, the top hem and the bottom hem.

3. The computer enclosure as claimed in claim 1, wherein the front panel comprises a side flange defining a pair of first through holes, the top board comprises a top bent plate depending therefrom, the bottom board comprises a bottom bent plate extending upwardly therefrom, each of the top and bottom bent plates defines a second through hole in alignment with a corresponding first through hole, and rivets extend through the second through holes and first through holes forming fixed joints between the cover and the front panel.

4. The computer enclosure as claimed in claim 1, wherein the rear panel defines a first through aperture in a top portion thereof, the cover further comprises a top fringe depending from a rear edge of the top board, the top fringe defines a second through aperture, and a rivet extends through the second through aperture and the first through aperture forming a fixed joint between the cover and the rear panel.

5. The computer enclosure as claimed in claim 4, wherein the rear panel further defines a first through bore in a bottom portion thereof, the cover further comprises a bottom fringe extending upwardly from a rear edge of the bottom board, the bottom fringe defines a second through bore, and a rivet extends through the second through bore and the first through bore forming a fixed joint between the cover and the rear panel.

6. A computer enclosure comprising:
   a cage defining a U-shaped configuration and integrally formed from a metal sheet, said cage including front and rear panels parallel to each other, and a side panel perpendicularly connecting to both said front and rear panels; and
   a cover defining a U-shaped configuration and integrally formed from another metal sheet, said cover generally including top and bottom boards parallel to each other, and a side board perpendicularly connected to both said top and bottom panels; wherein
   in assembling, said cage cooperates with said cover to substantially veil an exterior of said enclosure except one side opposite to said side panel.

7. The enclosure as claimed in claim 6, wherein said cage is assembled to the cover in a direction perpendicular to both said front and rear panels.

8. The enclosure as claimed in claim 6, wherein said side panel and said side board are overlapped with each other in a direction perpendicular to both said side panel and said side board.

9. A computer enclosure comprising:
   a cover including at least opposite top and bottom boards, and
   a cage integrally formed from a metal sheet, said cage comprising:

front and rear panels parallel to each other, and a side panel perpendicularly connecting to both said front and rear panels;

said front panel defining a drive opening, for receipt of a disk drive, with a portion of said front panel stamped from said opening, said portion being bent to be parallel to said side panel; and means formed on the side panel and the portion for engagement with two sides of said disk drive, respectively; wherein in assembling, said cage cooperates with said cover to substantially veil an interior of said enclosure except one side opposite to said side panel.

10. The enclosure as claimed in claim 9, wherein said cover further includes a side board connected between said top and bottom boards, and said side board is at least partially overlapped with side panel.

* * * * *